United States Patent
Murai et al.

[11] Patent Number: 6,130,675
[45] Date of Patent: Oct. 10, 2000

[54] COLOR IMAGE FORMATION METHOD AND COLOR IMAGE FORMATION APPARATUS

[75] Inventors: Kazumasa Murai; Hitoshi Ogatsu, both of Ashigarakami-gun, Japan

[73] Assignee: Fuji Xerox Co., Ltd., Tokyo, Japan

[21] Appl. No.: 09/005,029

[22] Filed: Jan. 12, 1998

[30] Foreign Application Priority Data

Jan. 14, 1997 [JP] Japan ......................................... 9-4954
Dec. 10, 1997 [JP] Japan ...................................... 9-340202

[51] Int. Cl.[7] ...................................................... G06F 15/00
[52] U.S. Cl. .............................................................. 345/431
[58] Field of Search ..................................... 345/429, 431, 345/430, 150, 151, 152, 153, 154

[56] References Cited

U.S. PATENT DOCUMENTS 5,883,632  3/1999  Dillinger .................................. 345/431
5,956,044  9/1999  Giorgianni et al. ..................... 345/431

FOREIGN PATENT DOCUMENTS

5-48657   2/1993  Japan .
6-189121  7/1994  Japan .

*Primary Examiner*—Phu K. Nguyen
*Attorney, Agent, or Firm*—Oliff & Berridge, PLC

[57] ABSTRACT

Input color signals are input at step S11 and are converted into first CMYK color material amounts to minimize a first distance function at step S12. At step S13, color coordinates reproduced from the first CMYK color material amounts are obtained based on a printer model. If the input color signals are determined within a color reproduction range at step S14, the first CMYK color material amounts are output at step S22. If the input color signals are determined outside the color reproduction range, reproduced lightness is compared with input lightness at step S15. If the reproduced lightness is less than the input lightness, lightness weight α responsive to a yellow saturated color rate is used to generate a second distance function at steps S16–S18. On the other hand, if the reproduced lightness is equal to or greater than the input lightness at step S15, a second distance function having weight as a constant is generated at steps S19 and S20. Second YMCK color material amounts to minimize the second distance function are calculated at step S21 and are output at step S22.

38 Claims, 6 Drawing Sheets

COLOR IMAGE FORMATION METHOD AND COLOR IMAGE FORMATION APPARATUS

BACKGROUND OF THE INVENTION

This invention relates to a color image formation method and a color image formation apparatus for reproducing colors according to the color material amounts of three or more colors including a color copier, a color printer, etc., and in particular to a color image formation method and a color image formation apparatus for determining an appropriate color material amount at the color reproduction time from an input color signal.

A color image formation apparatus places color material for forming an image on a recording medium on a recording medium by a method dependent on a unit, thereby forming an image. The color reproduction range is subject to limitations of the physical characteristics of the recording medium, color material, etc., the color material placement method, and the like. Generally, for full color printing, the three primary colors of cyan, magenta, and yellow or the three primary colors plus India ink are used.

On the other hand, a full color image may be independent of the limitations and actually contain a record-impossible color area outside the color reproduction range. For example, if an attempt is made to form a hard copy image based on the image displayed on a CRT unit, an area in which the color image cannot be reproduced may occur because the CRT unit differs from the image formation unit for forming the hard copy image in color reproduction range.

Thus, to reproduce an image containing color outside the color reproduction range of one image formation unit, an unreproducible color area needs to be replaced with a reproducible color area. Such operation is called color gamut compression. General techniques known as color gamut compression methods include a technique of replacing with color having the minimum color difference (coloriometric mapping), a technique of color gamut compression by dropping the saturation of the whole image (perceptual mapping), etc. For example, color outside the reproduction range is replaced with color having the minimum color difference in a unit (system) described in the Examined Japanese Patent Application Publication No. Hei 5-48657.

As another color gamut compression technique, a technique, for example, described in the Unexamined Japanese Patent Application Publication No. Hei 6-189121 is known to reproduce an image in only the three colors of cyan, magenta, and yellow. The technique assumes that an image displayed on a CRT unit is reproduced on a thermal sublimation printer for reproducing an image in the three colors of cyan, magenta, and yellow, and determines color gamut compression by using a difference evaluation function in response to an input signal for unreproducible color.

With recent color conversion technique development, such color gamut compression techniques have enabled color gamut compression with very high flexibility without giving side effects to colors in the color reproduction range.

To reproduce colors outside the color reproduction range by the conventional color gamut compression, attention is focused only on the shape of the color reproduction range and how colors outside the color reproduction range are compressed in the color reproduction range is considered. However, when actual color reproduction is executed, the lightness of a color mixture remarkably changes or if hue changes only a little, saturation remarkably changes. The reason why the problem arises is that the characteristics of color material used for actual image formation are not considered for compression into the color reproduction range.

For example, generally yellow color material can be reproduced in high lightness, but cyan and magenta color materials lower in lightness if the concentration is high or the area percentage is large. If colors are mixed, any color materials tend to lower in lightness. If the color reproduction range is compressed without considering such characteristics, the lightness remarkably changes or saturation remarkably lowers depending on hue.

A desirable compression method and evaluation function vary depending on whether reproduced color is light or dark as compared with input color or whether or not saturation is low although they equal in lightness. For example, to reproduce an image using only one yellow color material by controlling the area percentage on different printers, it in often desirable to reproduce the image in color that can be reproduced in the range in which colors are not mixed even if the color difference increases rather than to reproduce the image in color mixture having the minimum color difference.

Although there are the characteristics of the shape of the color reproduction range caused by color material actually used for recording, in the conventional color gamut compression techniques, a unified technique has been used in every hue direction as in the coloriometric mapping.

On the other hand, for example, green in reproduced by color mixture, thus it is desirable to reproduce color with a small color difference or lightness difference rather than to maintain the distribution of color materials making up the color mixture. For blue-family colors, particularly color mixture of cyan and magenta having low lightness is used, thus it is desired that high-lightness color outside the color reproduction range is reproduced with a lightness difference as small as possible. However, in the conventional color gamut compression techniques, attention is focused on reproduced color and input color and such distribution adjustment is not considered.

SUMMARY OF THE INVENTION

It is therefore an object of the invention to provide a color image formation method and a color image formation apparatus for executing appropriate color gamut compression depending on the amounts and distribution of reproduced color materials in addition to reproduced colors and input colors and reproducing a good color image.

According to the invention, in a color image recording apparatus for controlling reproduced colors in response to color material amounts of three or more colors, input color signals are converted into first color material amounts so as to minimize a distance as a first distance function defined on a predetermined color space, a second distance function defined on the predetermined color space is generated from the first color material amounts and the input color signals, and output color material amounts are determined from the input color signals so as to minimize a distance on the predetermined color space as the generated second distance function. A color image is formed in response to the determined output color material amounts.

For example, the colors reproduced in response to the first color material amounts are found on the predetermined color space and the second distance function can be generated from the color coordinates of the reproduced colors, the first color material amounts, and the input color signals. Further, color saturation is calculated from the first color material amounts and can also be added for generating the second distance function. Alternatively, if the input color signals are outside the color reproduction range based on the input color signals, the first color material amounts, and the distance as the first distance function between the input color signals and the first color material amounts, which of overlight, equal lightness and oversaturation, and overdark the input color signals are with respect to the color reproduction range is determined, distribution or color saturation of the first color material amounts is recognized in response to the determination result, and the second distance function can also be generated from the distribution or color saturation of the first color materials, the input color signals, and the color coordinates of the reproduced colors.

More particularly, the second distance function can be generated so as to have a function value to which at least one of the lightness, the chromaticity, and the hue difference contributes in response to the contribution degree depending on the input color signals (for example, the lightness and the color difference from a white color point) and the first color materials (for example, the distribution or color saturation of the first color material amounts). Alternatively, the second distance function can be generated as a function containing a term of multiplying at least one of the lightness difference, the chromaticity difference, and the amount equivalent to the hue difference by a predetermined coefficient based on the input color signal (for example, the lightness and the color difference from a white color point) and the first color materials (for example, the distribution or color saturation of the first color material amounts).

To use the color saturation, for example, the saturated color rate of yellow easily affected by color mixture can be used. If the distance as the first distance function is equal to or less than a predetermined value, the first color material amounts can be used as the output color material amounts.

The second distance function is generated considering various factors as described above rather than determined evenly as in the conventional method. Thus, appropriate color gamut compression can be executed, for example, in response to the reproduced colors, the input colors, the amounts and distribution of the reproduced color materials, etc., whereby the colors outside the color reproduction range can also be reproduced in appropriate reproducible colors and a high-quality color image can be reproduced.

DETAILED DESCRIPTION OF THE PREFERRED EMBODIMENTS

Figure 1:
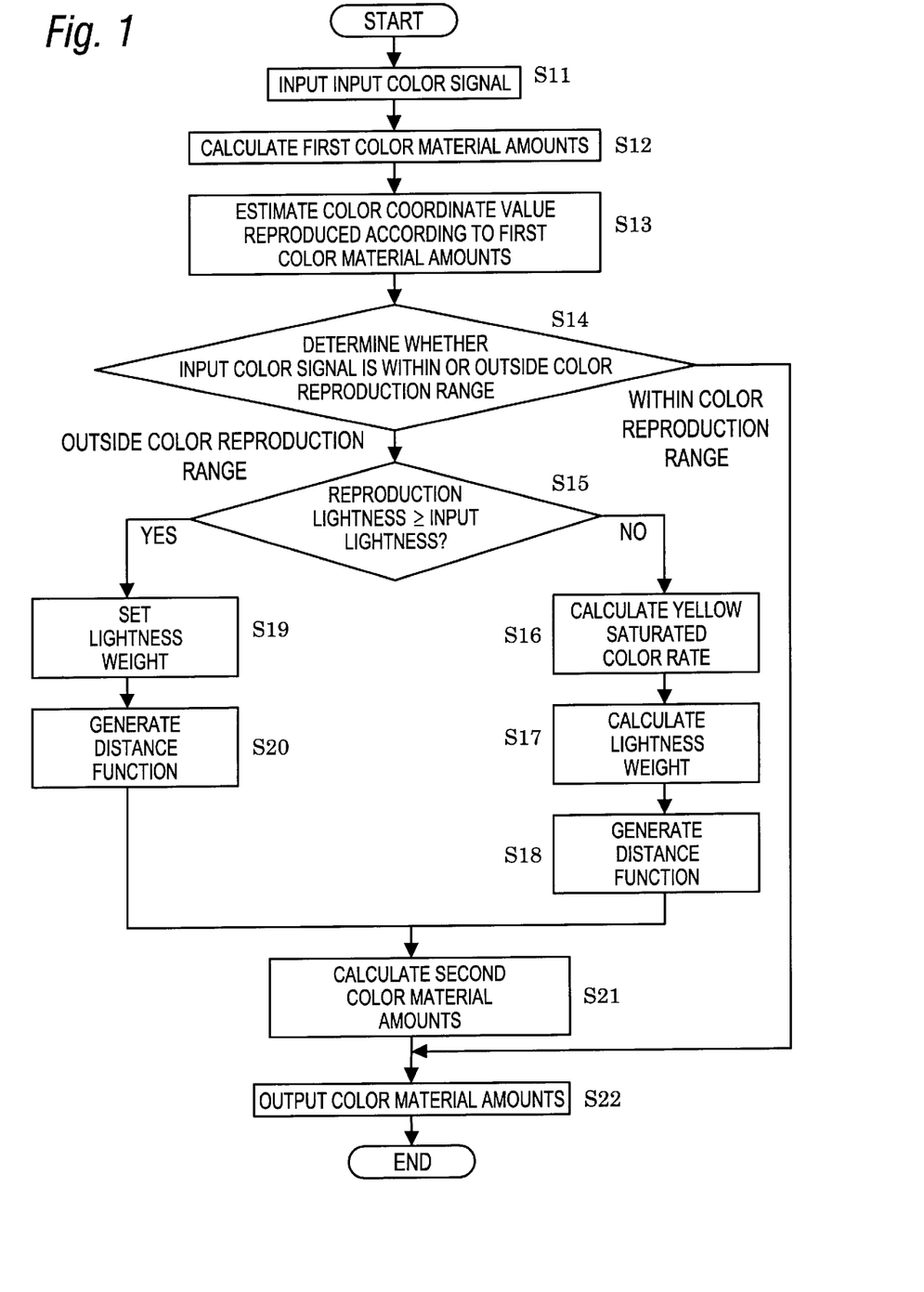
FIG. 1 is a flowchart to show a first embodiment of a color image formation method of the invention.

FIG. 1 is a flowchart to show a first embodiment of a color image formation method of the invention. Here, conversion of color coordinate values on a CIE L*a*b* (D50) color space to color material amounts of, for example, cyan (C), magenta (M), yellow (Y), and black (K), which will be hereinafter referred to as CMYK color material amounts, of a predetermined printer will be discussed. The color space of input color signals is assumed to be the same as a color space defining a distance described later, but if they are not the same, the invention can be applied.

First, at step S11, an input color signal is input. Since the color space of the input color signal is the L*a*b* color space, the input color signal value becomes the color coordinate value on the L*a*b* color space intact. At step S12, the color coordinate value of the input color signal is converted into first CMYK color material amounts so as to minimise a first distance function. At this time, an L*a*b* color difference is used as the first distance function. L*a*b* color difference $\Delta E$ between color coordinates (L*1a*1b*1) and (L*2a*2b*2) on the L*a*b* color space is given as $$\Delta E = \{(L*1-L*2)^2 + (a*1-a*2)^2 + (b*1-b*2)^2\}$$

Generally, the CMYK color material amounts cannot uniquely be determined. The first CMYK color material amounts can be obtained, for example, by "flexible UCR" as described in 4-3 "Flexible UCR using L*a*b*" (Ninth shikisai kougaku conference paper collection, 1992, Kita et al.). Of course, any other method may be used.

At step S13, color coordinates on the L*a*b* color space to be reproduced are obtained from the first CMYK color material amounts based on a predetermined printer for forming an image using C, M, Y, and K color materials or its modeled printer (printer model). At step S14, the color coordinates obtained at step S13 are compared with the color coordinate value of the input color signal obtained at step S11. If the color difference therebetween is equal to or less than a predetermined value, it in assumed that good reproduction can be executed and the input color signal is determined "within color reproduction range." At step S22, the first CMYK color material amounts are output. On the other hand, if the color difference is greater than the predetermined value, it is assumed that good reproduction cannot be executed and the input color signal is determined "outside color reproduction range." Control goes to step S15.

At step S15, the reproduction lightness of the lightness axis value of the color coordinates obtained at step S13 is compared with the input lightness of the lightness value of the color coordinate value of the input color signal obtained at step S11. If the reproduction lightness is darker than the input lightness, namely, the state is "overdark," control goes to step S16 at which a yellow saturated color rate is calculated. The yellow saturated color rate is calculated as $$\text{yellow saturated color rate} = (Y+K)/(C+M+Y+3 \cdot K)$$

However, when C+M+Y+K=0, the yellow saturated color rate is set to 0.

Next, at step S17, lightness weight $\alpha$ is calculated based on the yellow saturated color rate found at step S16. The weight $\alpha$ is determined by $$\alpha = 2.0/(\text{yellow saturated color rate} + 1.0)$$

An shown here, the weight $\alpha$ is a value determined by the percentage of yellow. If an image in made up of only the saturated color of yellow, the weight $\alpha$ is set to 1; if an image does not contain any yellow, the weight $\alpha$ is act to 2. The constants such as 1.0 and 2.0 in the expression can be changed as desired in response to the range that the weight $\alpha$ to be set can take.

At step S18, the weight α is used to generate a second distance function ΔD. For example, the second distance function ΔD can be set as $$\Delta D = \sqrt{\{\alpha(L*1-L*2)^2+(a*1-a*2)^2+(b*1-b*2)^2\}}$$

Second YMCK color material amounts are calculated so as to minimize the second distance function ΔD at step S21, and are output at step S22.

The second distance function ΔD is a function applied when the reproduction lightness is darker than the input lightness, namely, the state is "overdark." As described above, the yellow color material easily reproduces high lightness and it the yellow color material amount is large, it is desirable to reproduce an image in colors that can be reproduced in the range in which colors are not mixed although the color difference grows rather than to reproduce in color mixture with the minimum color difference. Thus, if the reproduced image is dark, when the yellow saturated color rate is large, the weight α is lessened to dull the sensitivity of the second distance function ΔD to the lightness difference, resulting in a function for holding the color difference and allowing a large lightness difference. In contrast, when the yellow saturated color rate is small, the weight α is increased to sharpen the sensitivity of the second distance function ΔD to the lightness difference for lowering the sensitivity to the color difference relatively, resulting in a function not much changing the lightness.

On the other hand, if the input color signal is determined "outside color reproduction range" at step S14 and if it is determined at step S15 that the reproduction lightness is lighter than the input lightness, namely, the state is "overlight" or that saturation in too high although the reproduction lightness is equal to the input lightness, namely, the state is "equal lightness and oversaturation," control goes to step S19 at which the weight α is set. Here, it is set to 2. At step S20, for example, the second distance function ΔD is determined by $$\Delta D = \{2(L*1-L*2)^2+(a*1-a*2)^2+(b*1-b*2)^2\}$$

Second YMCK color material amounts are calculated so as to minimize the second distance function ΔD at step S21, and are output at step S22.

In the second distance function ΔD, the constant set in the weight α may be any value for determining the sensitivity to the lightness difference as described above. If the value is large, the function value largely changes depending on the lightness difference. Thus, to minimize the function, the lightness difference must be lessened and relatively the lightness is held. In contrast, if the value is small, the function value does not change depending on the lightness difference and changes in response to the color difference. Thus, to minimize the function, the color difference must be lessened and relatively the color difference can be held.

Figure 2:
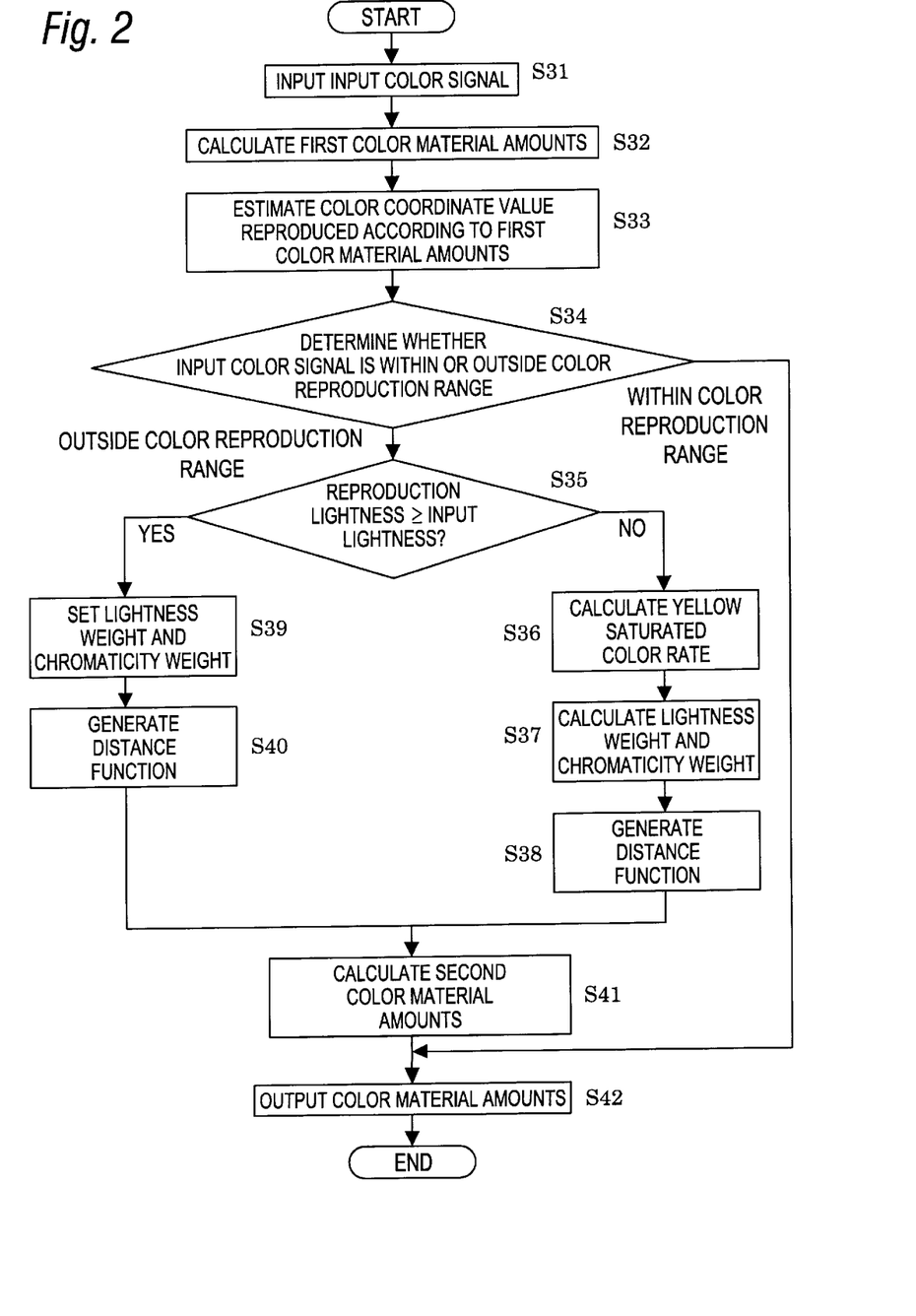
FIG. 2 is a flowchart to show a second embodiment of a color image formation method of the invention.

FIG. 2 is a flowchart to show a second embodiment of a color image formation method of the invention. As in the first embodiment, color coordinate value on the CIB L*a*b* (D50) color space are converted into color material amounts of a predetermined printer for forming an image using C, M, Y, and K color materials.

First, at step S31, a color coordinate value on the L*a*b* color space is obtained from an input color signal. At step S32, the color coordinate value or the input color signal is converted into first CMYK color material amounts so as to minimize an L*a*b color difference (first distance function). In the following process, K is not used. At step S33, color coordinates on the L*a*b* color space to be reproduced according to the first CMYK color material amounts are obtained based on a printer model.

At step S34, the color coordinates obtained at step S33 are compared with the color coordinate value obtained at step S31. If the color difference therebetween is equal to or less than a predetermined value, it is assumed that the input color signal is determined "within color reproduction range." At step S42, the first CMYK color material amounts obtained at step S32 are output.

On the other hand, at step S34, if the color difference is greater than the predetermined value and the input color signal is determined "outside color reproduction range," control goes to step S35 at which the reproduction lightness of the lightness axis value of the color coordinates obtained at step S33 is compared with the input lightness of the lightness value of the color coordinate value of the input color signal obtained at step S31. If the reproduction lightness is darker than the input lightness, namely, the state is "overdark," control goes to step S36 at which a yellow saturated color rate is calculated. Here, the yellow saturated color rate is as follows:

Yellow saturated color rate=$Y/(Y+M+C)$.

However, when C=M=Y=0, the yellow saturated color rate is set to 0.

At step S37, lightness weight α is calculated based on the yellow saturated color rate calculated at step S36. The lightness weight α is determined by α=2.0/(yellow saturated color rate+1.0)

This expression is the same as the expression in the first embodiment. Chromaticity weight β is calculated from the maximum value of the color material amounts, namely, max (Y, M, C). It is calculated by β=200.0/(max (Y, M, C)+100.0)

where Y, M, C is area percentage (%) and the constants 200.0 and 100.0 can be set as desired depending on the range of the weight β to be set.

The weight β is a value increased in an area in which the maximum value of the color material amounts is close to 0, namely, in a pale color area and decreased in a deep color area. If importance is attached to the lightness in a pale color with high saturation, the saturation of reproduced color may lower remarkably. Distance function can be determined so as to increase the chromaticity weight β in a pale color area and attach importance to the saturation by multiplying a* value difference and b* value difference by the weight β. Here, the maximum value of the color material amounts is used, but if the lightness of the input color signal or the sum total of the CMY color material amounts is used to determine the weight β, a similar effect can be produced.

Next at step S38, the lightness weight α and the chromaticity weight β are used to generate a second distance function ΔD. For example, the second distance function ΔD can be defined as $$\Delta D = \sqrt{\{\alpha(L*1-L*2)^2+\beta(a*1-a*2)^2+\beta(b*1-b*2)^2\}}$$

This second distance function ΔD can change the lightness weight in accordance with the characteristics of the yellow color material in response to the weight α as in the first embodiment and can change the chromaticity weight in accordance with light and dark of an image.

On the other hand, if the input color signal is determined "outside color reproduction range" at step S34 and if it is determined at step S35 that the reproduction lightness is lighter than the input lightness, namely, the state is "overlight" or that saturation is too high although the reproduction lightness is equal to the input lightness, namely, the state is "equal lightness and oversaturation," control goes to step S39 at which the lightness weight α and the chromaticity weight β are set to predetermined values. Here, the lightness weight α and the chromaticity weight β are set to 2 and 1 respectively. They can be set to any values. At step S40, the second distance function ΔD is generated. For example, it can be defined as $$\Delta D = \sqrt{\{2(L*1-L*2)^2 + (a*1-a*2)^2 + (b*1-b*2)^2\}}$$

from α=2 and β=1 set at step S39.

After the second distance function ΔD is generated at step S38 or S40, at step S41, the color coordinate value of the input color signal is converted into second CMYK color material amounts so as to minimize the generated second distance function ΔD. At step S42, the second CMYK color material amounts obtained at step S41 are output.

Figure 3:
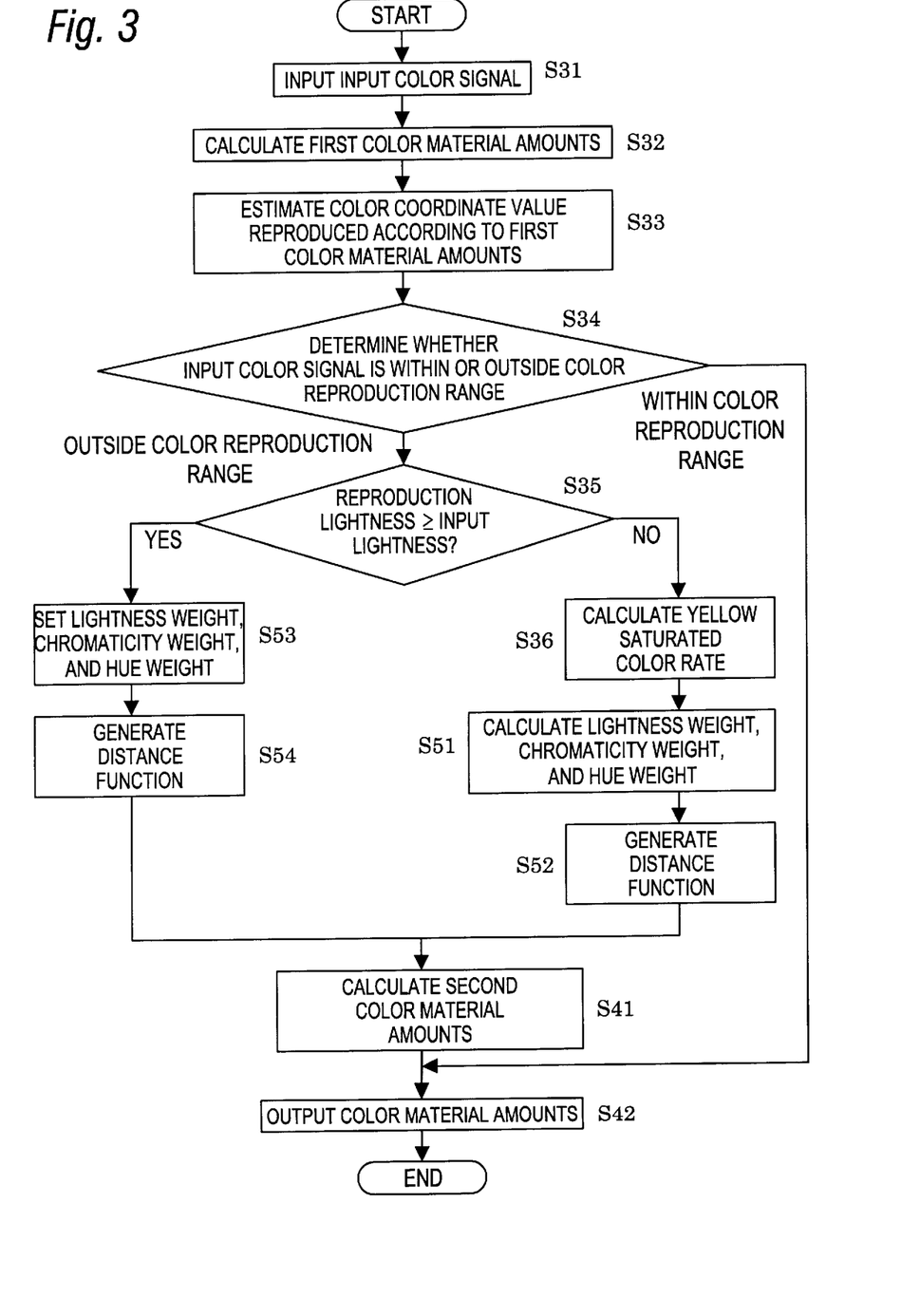
FIG. 3 is a flowchart to show a third embodiment of a color image formation method of the invention.

FIG. 3 is a flowchart to show a third embodiment of a color image formation method of the invention. The third embodiment is an example wherein hue as well as lightness and chromaticity is considered for generating a second distance function. Here, conversion of color coordinate values on a CIE XYZ reflection factor (D50) color space to color material amounts of a predetermined printer for forming an image using C, M, Y, and K color materials will be discussed.

First, at step S31, a color coordinate value on the XYZ reflection factor color space is obtained from an input color signal. Generally, the color difference is not defined on the XYZ reflection factor color space, but the XYZ reflection factor color space can be converted uniquely into the L*a*b* color space. Since the color difference can be defined on the L*a*b* color space, here the color difference on the XYZ reflection factor color space is assumed to be the color difference on the L*a*b* color space corresponding the XYZ reflection factor color space.

At step S32, the color coordinate value of the input color signal is converted into first CMYK color material amounts so as to minimize an L*a*b* color difference (first distance function). In the following process, K is not used. At step S33, color coordinates on the XYZ reflection factor color space to be reproduced according to the first CMYK color material amounts are obtained based on a printer model.

At step S34, the color coordinates obtained at step S33 are compared with the color coordinate value obtained at step S31. If the color difference therebetween is equal to or less than a predetermined value, it is assumed that the input color signal in determined "within color reproduction range." At step S42, the first CMYK color material amounts obtained at step S33 are output.

On the other hand, at step S34, if the color difference is greater than the predetermined value and the input color signal is determined "outside color reproduction range," control goes to step S35 at which the reproduction lightness of the lightness axis value of the color coordinates obtained at step S33 is compared with the input lightness of the lightness value of the color coordinate value of the input color signal obtained at step S31. If the reproduction lightness is darker than the input lightness, namely, the state is "overdark," control goes to step S36 at which a yellow saturated color rate is calculated. Here, as in the second embodiment, the yellow saturated color rate is as follows:

Yellow saturated color rate=$Y/(Y+X+C)$.

However, when C=M=Y=0, the yellow saturated color rate is set to 0.

At step S51, lightness weight α, chromaticity weight β, and weight of amount equivalent to hue, γ, are calculated. First, the lightness weight α is calculated based on the yellow saturated color rate calculated at step S36. In the third embodiment, the lightness weight α is determined by α=(3.0-y)/(yellow saturated color rate +1.0)

where Y reflection factor y on the XYZ reflection factor color space denotes lightness. If the Y reflection factor is high, namely, the lightness is high, the term (3.0-y) lessens. In contrast, if the Y reflection factor is low, namely, the lightness is low, the term (3.0-y) grows. In the first embodiment, in a pale color area with high lightness and low yellow saturated color rate such as pale blue, the lightness weight α grows and saturation tends to lower because importance is attached to the lightness. If such a distance function is used, a phenomenon in which pale blue becomes extremely light may occur in some cases. Then, in the third embodiment, reproduction of a pale color area can be improved by using the term considering the lightness for the lightness weight α. Here, the lightness is used to correct a pale color area. However, for example, the color difference from a white color point can also be used to correct a pale color area.

The chromaticity weight β is calculated from the maximum value of the color material amounts, namely, max (Y, M, C). As in the second embodiment, the chromaticity weight β is calculated by β=200.0/(max (Y, M, C)+100.0)

where Y, M, C is area percentage (%) and the constants 200.0 and 100.0 can be set as desired depending on the range of the weight β to be set.

The weight β is a value increased in an area in which the maximum value of the color material amounts is close to 0, namely, in a pale color area and decreased in a deep color area. If importance is attached to the lightness in a pale color with high saturation, the saturation of reproduced color may lower remarkably. Distance function can be determined so as to increase the chromaticity weight β in a pale color area and attach importance to the saturation by multiplying a* value difference and b* value difference by the weight β. Here, the maximum value of the color material amounts is used, but if the lightness of the input color signal or the sum total of the CMY color material amounts is used to determine the weight β, a similar effect can be produced.

In the third embodiment, further the weight of the amount equivalent to hue, γ, is calculated from the color material amounts. It is calculated is as follows:

γ=1.0−max (Y+K, M+K, C+K)/(Y+M+C+3=K)

The higher the color saturation, the smaller the value. On the color space, the closer to a single color of red, green, blue, the larger the value.

Next at step S52, the lightness weight α, the chromaticity weight β, and the weight of the amount equivalent to hue, γ, are used to generate a second distance function ΔD. For example, the second distance function ΔD can be defined as $$\Delta D = \sqrt{\{\alpha(L*1-L*2)^2 + \beta(a*1-a*2)^2 + \beta(b*1-b*2)^2\}} + \gamma$$
$$[\sqrt{\{(L*1-L*2)^2 + (a*1-a*2)^2 + (b*1-b*2)^2}$$
$$\} - \sqrt{\{(L*1-L*2)^2\}} - \sqrt{\{(a*1-a*2)^2 + (b*1-b*2)^2\}}].$$

where the term $[\{(L*1-L*2)^2 + (a*1-a*2)^2 + (b*1-b*2)^2\} - \sqrt{\{(L*1-L*2)^2\}} - \sqrt{\{(a*1-a*2)^2 + (b*-b*2)^2\}}]$ is the difference of the amount equivalent to hue, known as metric hue. The second distance function $\Delta D$ can change the lightness weight in accordance with the characteristics of the yellow color material in response to the weight as in the first embodiment and can change the chromaticity weight in accordance with light and dark of an image.

On the other hand, if the input color signal is determined "outside color reproduction range" at step S34 and if it is determined at step S35 that the reproduction lightness is lighter than the input lightness, namely, the state is "overlight" or that saturation is too high although the reproduction lightness is equal to the input lightness, namely, the state is "equal lightness and oversaturation," control goes to step S53 at which the lightness weight $\alpha$, the chromaticity weight $\beta$, and the weight of the amount equivalent to hue, $\gamma$, are set to predetermined values. Here, the lightness weight $\alpha$ is set to 2, the chromaticity weight $\gamma$, to 1, and the weight of the amount equivalent to hue, $\gamma$, to 0.3. They can be set to any values. At step S54, the second distance function $\Delta D$ is generated. For example, it can be defined as $$\Delta D = \sqrt{\{2(L*1-L*2)^2+(a*1-a*2)^2+(b*1-b*2)^2\}} + 0.3$$
$$[\sqrt{\{(L*1-L*2)^2+(a*1-a*2)^2+(b*1-b*2)^2\}}$$
$$\}-\sqrt{\{(L*1-L*2)^2\}}-\sqrt{\{(a*1-a*2)^2+(b*1-b*2)^2\}}]$$

from $\alpha=2$, $\beta=1$, and $\gamma=0.3$ set at step S53.

After the second distance function $\Delta D$ is generated at step S52 or S54, at step S41, the color coordinate value of the input color signal is converted into second CMYK color material amounts so as to minimize the generated second distance function $\Delta D$. At step S42, the second CMYK color material amounts obtained at step S41 are output.

Figure 4:
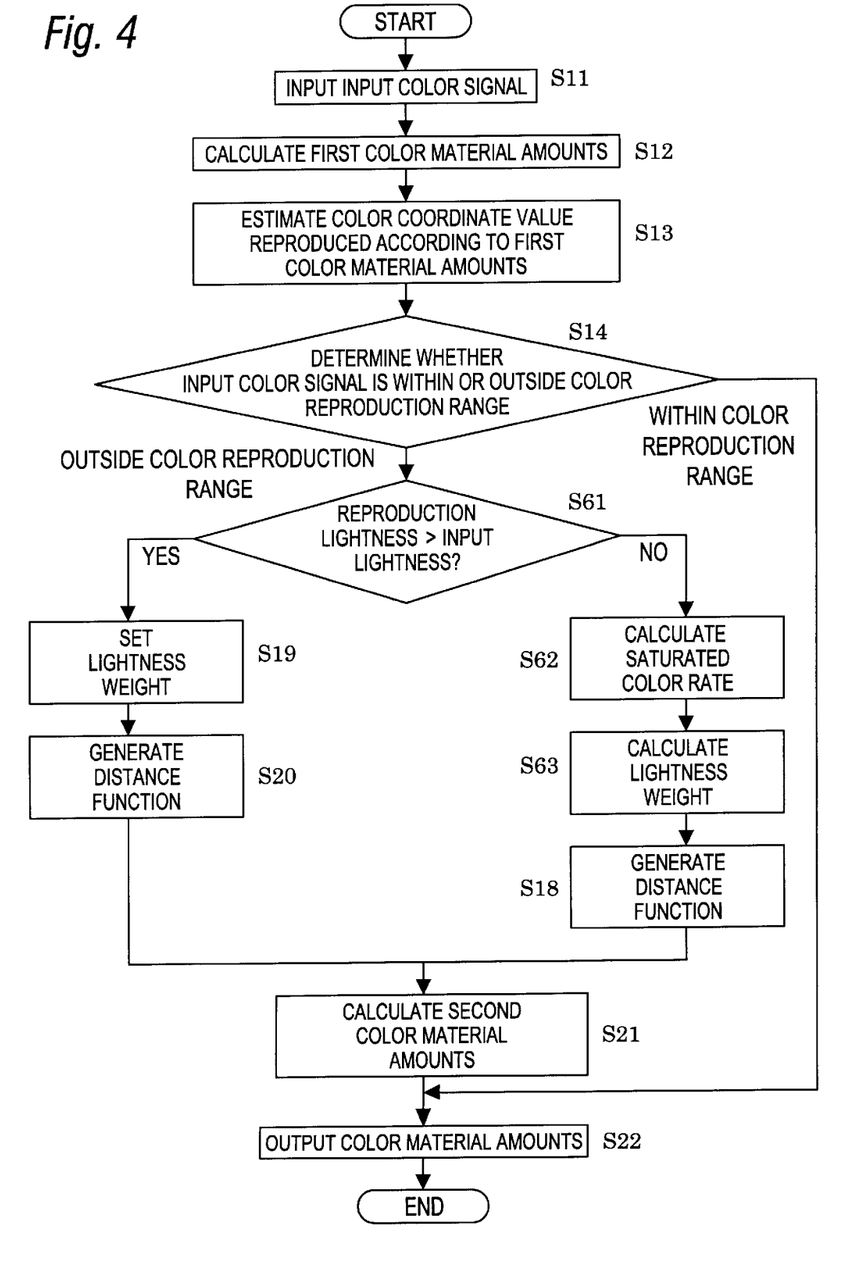
FIG. 4 is a flowchart to show a fourth embodiment of a color image formation method of the invention.

FIG. 4 in a flowchart to show a fourth embodiment of a color image formation method of the invention. Processing contents similar to those previously described with reference to FIG. 1 are denoted by the same reference numerals in FIG. 4 and will not be discussed again. The fourth embodiment uses "saturated color rate" in place of the "yellow saturated color rate" in the first embodiment.

If the determination at step S14 returns "outside color reproduction range," control goes to step S61 at which reproduction lightness is compared with input lightness. In the embodiment, if the reproduction lightness is equal to or less than the input lightness, weighing with a saturated color rate is executed. That is, if the reproduction lightness is equal to the input lightness ("equal lightness and oversaturation"), the same processing as "overdark" is also performed.

At step S62, a saturated color rate is calculated. For example, the a saturated color rate can be determined by saturated color rate=max $(Y+K, M+K, C+K)/(Y+M+C+3\cdot K)$ This is used to calculate lightness weight $\alpha$ at step S63. According to the first embodiment, the weight $\alpha$ can be determined by $\alpha=2.0/$(saturated color rate$+1.0$)

The constants in the expression are also any values. A second distance function $\Delta D$ generated at step S18 is similar to that in the first embodiment.

The saturated color rate may be calculated without using K as in the second embodiment. In this case, for example, the saturated color rate can be determined by saturated color rate=max $(Y, M, C)/(Y+M+C)$ In addition to the lightness weight $\alpha$, the chromaticity weight $\beta$ shown in the second embodiment may be used as the weight used to generate the second distance function $\Delta D$ for generating the second distance function $\Delta D$ in the second embodiment. Of course, the weight of the amount equivalent to hue, $\gamma$, shown in the third embodiment can also be used to generate the second distance function $\Delta D$.

The saturated color rate is used as shown in the fourth embodiment, whereby for dark color close to saturated color of cyan, magenta other than yellow, the lightness is changed without changing the chromaticity and color gamut compression can be executed so that color materials are not mixed. For "equal lightness and oversaturation", the same processing as "overdark" is performed in the embodiment, but the same processing as "overlight" may be performed as in the first embodiment.

Figure 5:
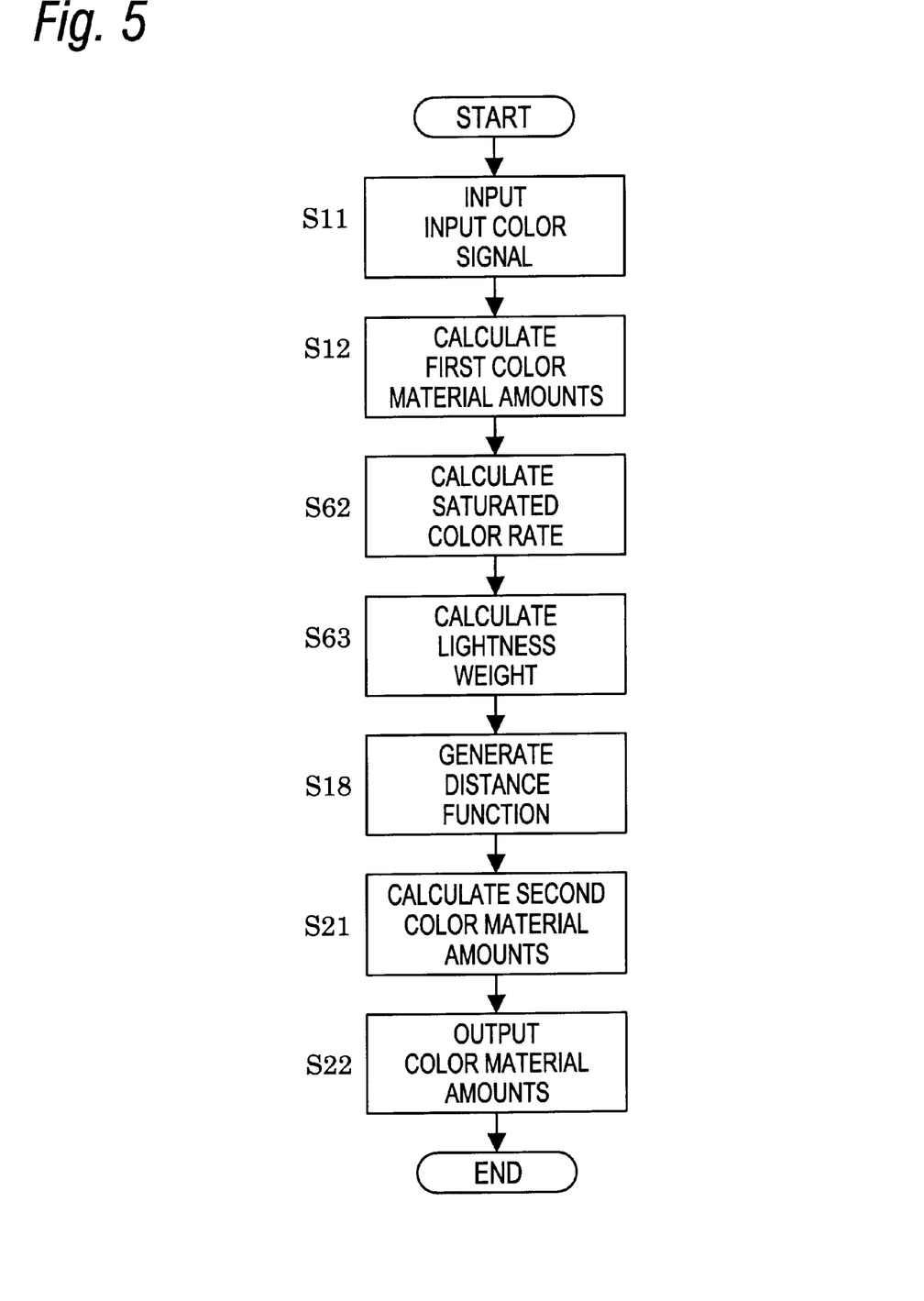
FIG. 5 is a flowchart to show a fifth embodiment of a color image formation method of the invention.

FIG. 5 is a flowchart to show a fifth embodiment of a color image formation method of the invention. Processing contents similar to those previously described with reference to FIG. 4 are denoted by the same reference numerals in FIG. 5 and will not be discussed again. In the fifth embodiment unlike the three embodiments described above, color reproduction range determination and lightness difference determination are not executed.

As in the embodiments described above, an input color signal is input at step S11 and first CMYK color material amounts are calculated based on the color coordinate value of the input color signal at step S12. Next, color reproduction range determination and lightness difference determination are skipped and similar processing to that for "overlight," "equal lightness and oversaturation" in the fourth embodiment is performed. At step S62, a saturated color rate is calculated. Based on the saturated color rate, lightness weight $\alpha$ is calculated at step S63 and a second distance function $\Delta D$ is generated at step S18. Second CMYK color material amounts are calculated so as to minimize the second distance function $\Delta D$ at step S21, and are output at step S22.

To find the second CMYK color material amounts, similar processing is also performed for colors within the color reproduction range. Since the distance becomes 0 independently of the distance function within the color reproduction range because of the nature of the distance, the first CMYK color material amounts are reproduced as the second CMYK color material amounts intact. In the embodiment, "overlight," "overdark," and "equal lightness and oversaturation" are not distinguished from each other. Thus, in any case, conversion is executed in response to the saturated color rate. Of course, chromaticity weight $\beta$ and weight of amount equivalent to hue, $\gamma$, as well as lightness weight $\alpha$ may be used to generate the second distance function $\Delta D$.

The expressions of the first distance function $\Delta E$, the second distance function $\Delta D$, the yellow saturated color rate, the saturated color rate, the lightness weight $\alpha$, the chromaticity weight $\beta$, and the weight of the amount equivalent to hue, $\gamma$, are shown as examples; appropriate expressions thereof can be defined and generated in response to the purpose and the unit (system).

Figure 6:
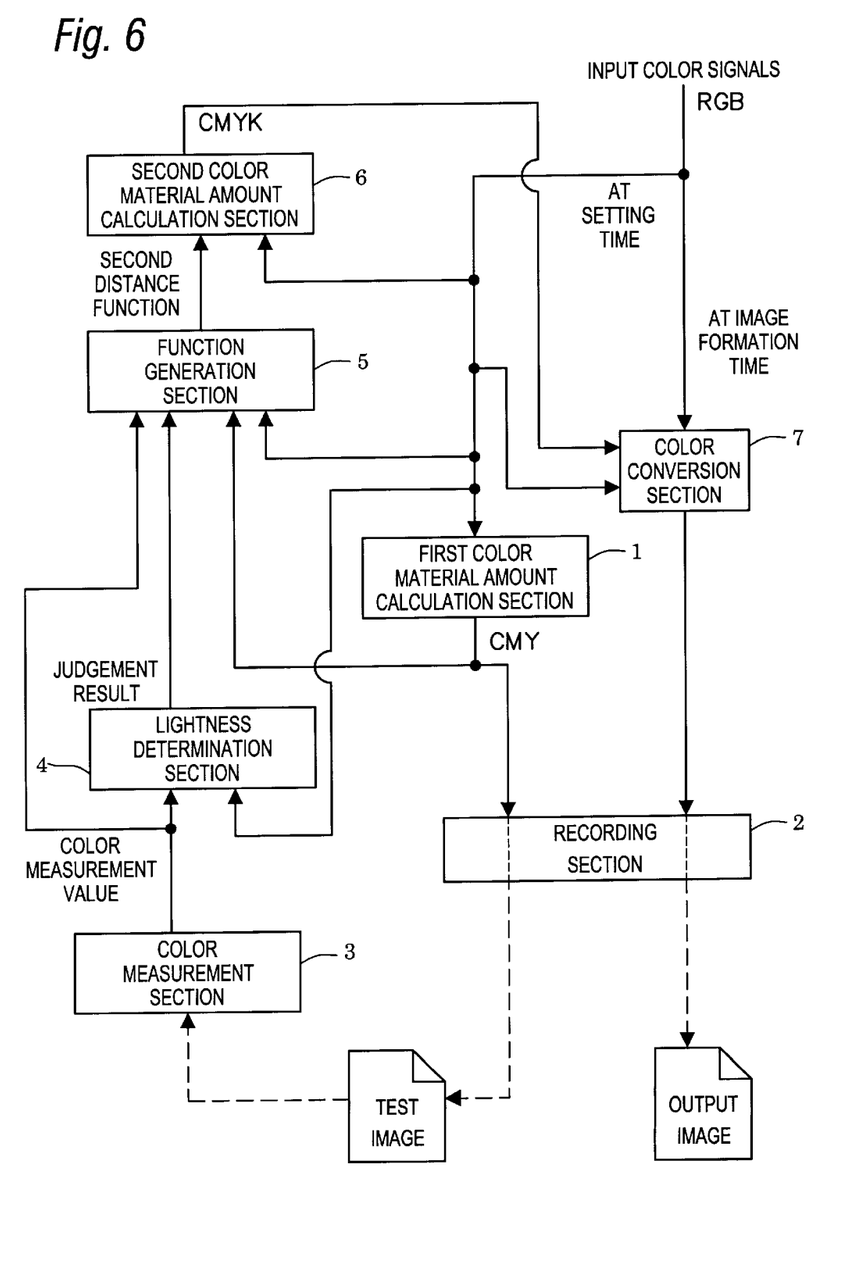
FIG. 6 is a block diagram to show one embodiment of a color image formation apparatus of the invention.

FIG. 6 is a block diagram to show one embodiment of a color image formation apparatus of the invention. In the figure, numeral 1 is a first color material amount calculation section, numeral 2 is a recording section, numeral 3 is a color measurement section, numeral 4 is a lightness determination section, numeral 5 is a function generation section, numeral 6 is a second color material amount calculation section, and numeral 7 is a color conversion section. Here, RGB signals are input as input color signals and the recording section 2 uses C, M, Y, and K color materials for recording.

The first color material amount calculation section 1 converts RGB signals of input color signals into, for example, color coordinates on an L*u*v* color space and uses a first distance function to calculate CMY signals of three colors without using K (India ink) so as to minimize the L*u*v* color difference. The resultant CMY signals are recorded by the recording section 2 for forming a test image.

The color measurement section 3 measures colors of the test image and sends the color measurement value of the reproduced colors to the lightness determination section 4, which then compares the lightness of the color measurement value with the lightness of the input color signals and outputs the comparison result to the function generation section 5.

The function generation section 5 generates a second distance function defined on the L*u*v* color space based on the color measurement value of the reproduced colors from the color measurement section 3, the CMY signals calculated by the first color material amount calculation section 1, and the input color signals in response to the determination result of the lightness determination section 4 and outputs the second distance function to the second color material amount calculation section 6. At this time, the yellow saturated color rate, color saturation, etc., can be used. Light and dark of the colors, hue, etc., may be considered.

The second color material amount calculation section 6 uses the second distance function generated by the function generation section 5 to determine the CMYK color material amounts so as to minimize the distance from the input color signals and stores the determined CMYK color material amounts in the color conversion section 7 in pairs with the RGB signals of the input color signals.

The color conversion section 7 stores the correspondence between the RGB signal values and the CMYK color material amounts in a table, etc., for example, and outputs the CMYK color material amounts corresponding to the input RGB signals to the recording section 2, which then forms an image in accordance with the CMYK color material amounts, whereby colors outside the color reproduction range of the recording section 2 can also be reproduced appropriately for providing a high-quality image.

The color image formation apparatus can realize any of the first to fifth embodiments of the color image formation methods described above. For example, to realize the first, fourth, and fifth embodiments described above, the first color material amount calculation section 1 converts the RGB signals into color coordinates on the L*a*b* color space and outputs first CMYK signals containing K (India ink) and the subsequent processing is performed on the L*a*b* color space. To realize the fifth embodiment, the lightness determination section 4 is not required.

At the normal image formation time, the first color material amount calculation section 1, the color measurement section 3, the lightness determination section 4, the function generation section 5, and the second color material amount calculation section 6 are not required, thus may be separated at the time. In contrast, the color conversion section 7 may be separated for use as the image formation apparatus only determining the color material amounts. A normally used color measurement instrument may be used intact as the color measurement section 3. Further, the recording section 2 may be connected to the color conversion section 7, etc., for example, via a network rather than directly connected thereto; various apparatus configurations are possible.

In the example apparatus, the recording section 2 uses the first CMY signals calculated by the first color material amount calculation section 1 for actual recording and the color measurement section 3 measures the reproduced colors. However, if the reproduced colors can be estimated from the first CMY signals, various methods, such as simulation, may be used.

An seen from the description made so far, according to the invention, the characteristics of the shape of the color reproduction range of the color gamut to be converted are grasped by once converting the input color signals into the color material amounts, a desirable compression direction is estimated in response to the amounts and distribution of the color materials, and color gamut compression is executed considering the estimated desirable compression direction, whereby appropriate color gamut compression can be executed in response to the amounts and distribution of the reproduced color materials in addition to the reproduced colors and input colors. Thus, the colors outside the color reproduction range can also be reproduced in appropriate reproducible colors and a high-quality image can be provided.

What is claimed is:

1. A color image formation method in a color image recording apparatus for controlling reproduced colors in response to color material amounts of three or more colors, said method comprising:

a first step of converting input color signals into first color material amounts so as to minimize a distance as a first distance function defined on a predetermined color space, a second step of generating a second distance function defined on the predetermined color space from the first color material amounts and the input color signals, and a third step of determining output color material amounts from the input color signals so as to minimize a distance on the predetermined color space as the generated second distance function so as to form a color image in response to the determined output color material amounts.

2. The color image formation method of claim 1, wherein said second step comprises:

a fourth step of finding colors reproduced in response to the first color material amounts on the predetermined color space and providing first color coordinates, and a fifth step of generating the second distance function defined on the predetermined color space from the first color material amounts, the input color signals, and the first color coordinates so as to generate the second distance function.

3. The color image formation method of claim 2, wherein said fifth step comprises:

a sixth step of calculating color saturation from the first color material amounts, and a seventh step of generating the second distance function defined on the predetermined color space from the color saturation, the input color signals, and the first color coordinates so as to generate the second distance function.

4. The color image formation method of claim 1, wherein said second step comprises:

an eighth step of determining which of overlight, equal lightness and oversaturation, and overdark the input color signals are with respect to a color reproduction range of the color image recording apparatus if the input color signals are outside the color reproduction range based on the input color signals, the first color material amounts, and the distance as the first distance function between the input color signals and the first color material amounts, a ninth step of recognizing distribution or color saturation of the first color material amounts in response to the determination result, and a tenth step of generating the second distance function defined on the predetermined color space from the distribution or color saturation, the input color signals, and the first color coordinates if the input color signals are outside the color reproduction range of the color image recording apparatus so as to generate the second distance function.

5. The color image formation method of claim 3, wherein the color materials contain at least cyan, magenta, and yellow; and wherein
a saturated color rate of yellow is calculated as the color saturation.

6. The color image formation method of claim 4, wherein the color materials contain at least cyan, magenta, and yellow; and wherein
a saturated color rate of yellow is calculated as the color saturation.

7. The color image formation method of claim 1, wherein the predetermined color space is a color space consisting of lightness and chromaticity, and wherein
the second distance function is generated by multiplying the lightness or the lightness and chromaticity by a predetermined coefficient.

8. The color image formation method of claim 1, wherein the predetermined color space is a color space consisting of lightness and chromaticity or a color space that can be uniquely converted into the color space consisting of lightness and chromaticity, and wherein
the second distance function generated in said second step has a function value to which at least one of the lightness and the chromaticity contributes in response to a contribution degree depending on the input color signals and the first color materials.

9. The color image formation method of claim 1, wherein the predetermined color space is a color space consisting of lightness and chromaticity or a color space that can be uniquely converted into the color space consisting of lightness and chromaticity, and wherein
the second distance function generated in said second step has a function value to which at least one of the lightness, the chromaticity, and an amount equivalent to a hue difference contributes in response to a contribution degree depending on the input color signals and the first color materials.

10. The color image formation method of claim 1, wherein
the second distance function generated in said second step is a function containing a term of multiplying at least one of tho lightness difference, the chromaticity difference, and the amount equivalent to the hue difference by a predetermined coefficient based on the input color signals and the first color materials.

11. The color image formation method of claim 3, wherein the predetermined color space in a color space consisting of lightness and chromaticity, and wherein
the second distance function is generated by multiplying at least the lightness by a coefficient based on the color saturation.

12. The color image formation method of claim 4, wherein
the predetermined color space is a color space consisting of lightness and chromaticity, and wherein
the second distance function is generated by multiplying at least the lightness by a coefficient based on the color saturation.

13. The color image formation method of claim 3, wherein
the predetermined color space is a color space consisting of lightness and chromaticity or a color space that can be uniquely converted into the color space consisting of lightness and chromaticity, and wherein
the second distance function generated in said second step has a function value to which at least one of the lightness, the chromaticity, and the amount equivalent to the hue difference contributes in response to a contribution degree depending on the input color signals and distribution or color saturation of the first color materials.

14. The color image formation method of claim 4, wherein
the predetermined color space is a color space consisting of lightness and chromaticity or a color space that can be uniquely converted into the color space consisting of lightness and chromaticity, and wherein
the second distance function generated in said second step has a function value to which at least one of the lightness, the chromaticity, and the amount equivalent to the hue difference contributes in response to a contribution degree depending on the input color signals and distribution or color saturation of the first color materials.

15. The color image formation method of claim 3, wherein
the second distance function generated in said second step is a function containing a term of multiplying at least one of the lightness difference, the chromaticity difference, and the amount equivalent to the hue difference by a predetermined coefficient based on distribution or color saturation of the first color materials.

16. The color image formation method of claim 4, wherein
the second distance function generated in said second step is a function containing a term of multiplying at least one of the lightness difference, the chromaticity difference, and the amount equivalent to the hue difference by a predetermined coefficient based on distribution or color saturation of the first color materials.

17. The color image formation method of claim 1, wherein
the predetermined color space is a color space consisting of lightness and chromaticity or a color space that can be uniquely converted into the color space consisting of lightness and chromaticity, and wherein
the second distance function generated in said second step has a function value to which at least one of the lightness, the chromaticity, and the amount equivalent to the hue difference contributes in response to a contribution degree depending on lightness of the input color signals and the first color materials.

18. The color image formation method of claim 1, wherein
the predetermined color space is a color space consisting of lightness and chromaticity or a color space that can be uniquely converted into the color space consisting of lightness and chromaticity, and wherein
the second distance function generated in said second step has a function value to which at least one of the lightness, the chromaticity, and the amount equivalent to the hue difference contributes in response to a contribution degree depending on a color difference from a white color point of the input color signals and the first color materials.

19. The color image formation method of claim 1, wherein
if the distance as the first distance function is equal to or less than a predetermined value in said first step, said second and third steps are skipped and the first color material amounts are determined as the output color material amounts.

20. A color image formation apparatus for reproducing colors with color materials of three or more colors, said apparatus comprising:
first color material amount conversion means for converting input color signals into first color material amounts so an to minimize a distance as a first distance function defined on a predetermined color space,
function generation means for generating a second distance function defined on the predetermined color space from the first color material amounts and the input color signals, and
second color material amount conversion means for converting the input color signals into output color material amounts so as to minimize a distance as the second distance function defined on the predetermined color space so as to form a color image in response to the output color material amounts.

21. The color image formation apparatus of claim 20, wherein
said function generation means comprises:
reproduced color providing means for finding colors reproduced in response to the first color material amounts on the predetermined color space and providing first color coordinates, and
generation means for generating the second distance function defined on the predetermined color space from the first color material amounts, the input color signals, and the first color coordinates.

22. The color image formation method of claim 21 wherein
said generation means comprises:
first means for calculating color saturation from the first color material amounts, and
second means for generating the second distance function defined an the predetermined color space from the color saturation, the input color signals, and the first color coordinates.

23. The color image formation method of claim 20, wherein
said function generation means comprises:
lightness comparison means for determining whether or not the input color signals are contained in a color reproduction range based on the input color signals, the first color material amounts, and the distance as the first distance function between the input color signals and the first color material amounts and if the input color signals are not contained in the color reproduction range, determining which of overlight, equal lightness and oversaturation, and overdark the input color signals are with respect to the color reproduction range,
recognition means for recognizing distribution or color saturation of the first color material amounts in response to the determination result of said lightness comparison means, and
generation means for generating the second distance function defined on the predetermined color space from the distribution or color saturation, the input color signals, and the first color coordinates it the input color signals are not contained in the color reproduction range.

24. The color image formation apparatus of claim 22, wherein
the color materials contain at least cyan, magenta, and yellow, and wherein
the color saturation is a saturated color rate of yellow.

25. The color image formation apparatus of claim 23, wherein
the color materials contain at least cyan, magenta, and yellow, and wherein
the color saturation is a saturated color rate of yellow.

26. The color image formation method of claim 20, wherein
the predetermined color space is a color space consisting of lightness and chromaticity, and wherein
said function generation means generates the second distance function by multiplying the lightness or the lightness and chromaticity by a predetermined coefficient.

27. The color image formation apparatus of claim 20, wherein
the predetermined color space is a color space consisting of lightness and chromaticity or a color space that can be uniquely converted into the color space consisting of lightness and chromaticity, and wherein
said function generation means generates the second distance function having a function value to which at least one of the lightness and the chromaticity contributes in response to a contribution degree depending on the input color signals and the first color materials.

28. The color image formation apparatus of claim 20, wherein
the predetermined color space is a color space consisting of lightness and chromaticity or a color space that can be uniquely converted into the color space consisting of lightness and chromaticity, and wherein
said function generation means generates the second distance function having a function value to which at least one of the lightness, the chromaticity, and an amount equivalent to a hue difference contributes in response to a contribution degree depending on the input color signals and the first color materials.

29. The color image formation apparatus of claim 20, wherein
said function generation means generates a function containing a term of multiplying at least one of the lightness difference, the chromaticity difference, and the amount equivalent to the hue difference by a predetermined coefficient based on the input color signals and the first color materials.

30. The color image formation apparatus of claim 22, wherein
the predetermined color space is a color space consisting of lightness and chromaticity, and wherein
said function generation means generates the second distance function by multiplying at least the lightness by a coefficient based on the color saturation.

31. The color image formation apparatus of claim 23, wherein
the predetermined color space is a color space consisting of lightness and chromaticity, and wherein said function generation means generates the second distance function by multiplying at least the lightness by a coefficient based on the color saturation.

32. The color image formation apparatus of claim 22, wherein the predetermined color space is a color space consisting of lightness and chromaticity or a color space that can be uniquely converted into the color space consisting of lightness and chromaticity, and wherein said function generation means generates the second distance function having a function value to which at least one of the lightness and the chromaticity to the hue difference contributes in response to a contribution degree depending on the input color signals and distribution or color saturation of the first color materials.

33. The color image formation apparatus of claim 23, wherein the predetermined color space is a color space consisting of lightness and chromaticity or a color space that can be uniquely converted into the color space consisting of lightness and chromaticity, and wherein said function generation means generates the second distance function having a function value to which at least one of the lightness and the chromaticity to the hue difference contributes in response to a contribution degree depending on the input color signals and distribution or color saturation of the first color materials.

34. The color image formation apparatus of claim 22, wherein the second distance function generated by said function generation means is a function containing a term of multiplying at least one of the lightness difference, the chromaticity difference, and the amount equivalent to the hue difference by a predetermined coefficient based on distribution or color saturation of the first color materials.

35. The color image formation apparatus of claim 23, wherein the second distance function generated by said function generation means is a function containing a term of multiplying at least one of the lightness difference, the chromaticity difference, and the amount equivalent to the hue difference by a predetermined coefficient based on distribution or color saturation of the first color materials.

36. The color image formation apparatus of claim 20, wherein the predetermined color space is a color space consisting of lightness and chromaticity or a color space that can be uniquely converted into the color space consisting of lightness and chromaticity, and wherein the second distance function generated by said function generation means has a function value to which at least one of the lightness, the chromaticity, and the amount equivalent to the hue difference contributes in response to a contribution degree depending on lightness of the input color signals and the first color materials.

37. The color image formation apparatus of claim 20, wherein the predetermined color space is a color space consisting of lightness and chromaticity or a color space that can be uniquely converted into the color space consisting of lightness and chromaticity, and wherein second distance function generated by said function generation means has a function value to which at least one of the lightness, the chromaticity, and the amount equivalent to the hue difference contributes in response to a contribution degree depending on a color difference from a white color point of the input color signals and the first color materials.

38. The color image formation apparatus of claim 20, wherein if the distance as the first distance function is equal to or less than a predetermined value, said first color material amount conversion means determines the first color material amounts as the output color material amounts.

* * * * *